Figure 1:
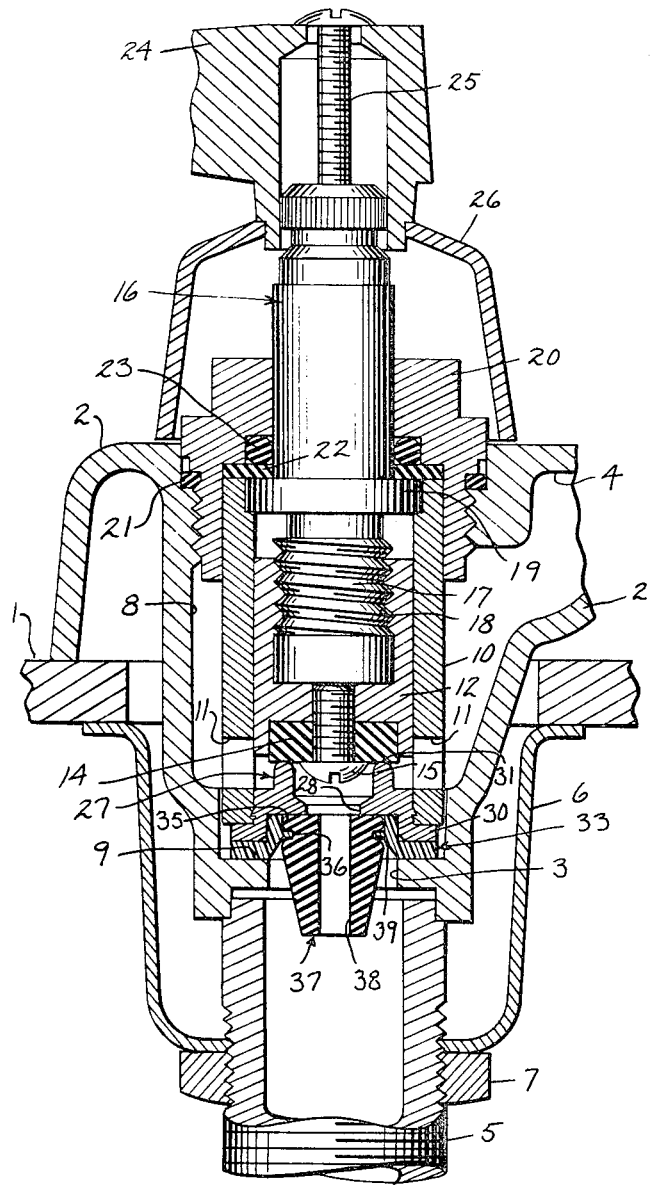

June 25, 1968   E. A. POVALSKI ETAL   3,389,717
REMOVABLE VALVE UNIT WITH FLOW CONTROL DEVICE
Filed July 15, 1966

INVENTORS
EUGENE A. POVALSKI
E. FREDERICK BOLGERT

BY *Allan W. Leiser*

ATTORNEY

United States Patent Office 3,389,717
Patented June 25, 1968

3,389,717
REMOVABLE VALVE UNIT WITH FLOW CONTROL DEVICE
Eugene A. Povalski and Edwin F. Bolgert, Kohler, Wis., assignors to Kohler Co., Kohler, Wis., a corporation of Wisconsin
Filed July 15, 1966, Ser. No. 565,516
4 Claims. (Cl. 137—315)

This invention relates to a removable valve unit for faucets and the like, and resides more particularly in a unit of this type including a flow control device.

A removable valve unit of the type contemplated herein is shown in U.S. Patent No. 3,006,361. The unit shown in that patent includes all working valve elements in a single, self-contained, removable assembly; and greatly simplifies repair and replacement of the valve parts or the entire valve unit.

In addition to providing for easy repair or replacement, it is highly desirable in many valve applications to provide a flow control device to maintain a constant flow rate in spite of line pressure variations. Substantial pressure variations are common, especially in an installation where a number of outlets are fed from a single supply, and in the absence of some flow control device an increase or decrease in pressure will correspondingly raise or lower the flow rate. Substantial flow rate changes are generally wasteful and inconvenient, can interfere with planned operation, for example in the case of an industrial water supply system, and can even be dangerous, for example in a shower system where a sudden increase in pressure could result in a surge of hot water from the shower head.

Various flow control devices are commercially available, and these usually include a resilient member with a flow passage through it, the resilient member being deformable in response to pressure variations to enlarge or reduce the size of the passage and thus maintain a constant flow rate. In most cases, such devices are supplied as self-contained units including a housing or casing which is fitted into the supply system at some appropriate point; and when it is desired to repair or replace the device it is necessary to wholly or partially dismantle the supply system. Further, self-contained flow control units of this type are relatively expensive. Because of these disadvantages, flow control devices have not heretofore been feasible for many applications, especially in relatively low cost residential plumbing installations.

It is the general object of this invention to provide a removable valve unit having the inherent advantages of such units and also including a flow control device that is mounted on and removable with the unit.

It is among the specific objects of this invention to provide a removable valve unit with a flow control device which is highly effective while being relatively simple and inexpensive to manufacture, assemble, install, inspect, repair and replace.

Other objects and advantages will appear from the description to follow. In the description, reference is made to the accompanying drawing which forms a part hereof in which there is shown, by way of illustration and not of limitation, a preferred embodiment of the invention.

Figure 2:
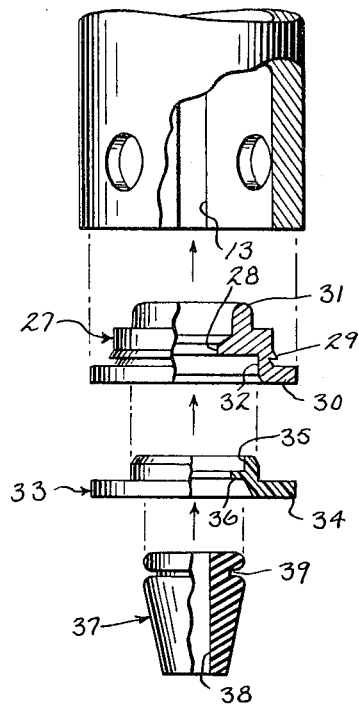

In the drawing:

FIG. 1 is an enlarged view in cross section of a valve unit formed according to the invention and forming a part of a sink installation, and FIG. 2 is an enlarged exploded view, with parts shown broken away and in cross section, further and more clearly illustrating certain elements of the unit of FIG. 1.

In FIG. 1, the reference numeral 1 designates the ledge portion of a conventional sink or the like, and the reference numeral 2 designates a conventional hollowed fitting or body within which the valve unit of the invention is housed. Neither the sink nor the body 2 are shown in detail, since their construction is well known to those skilled in the art, and since the valve unit of the invention is equally useful in many other well known types of installations.

The body 2 extends through and below the ledge 1 where it is provided with an inlet 3. Above the ledge 1, the body 2 is provided with an outlet 4 which may lead to a separate or joint discharge spout (not shown). The upper end of a nipple 5 is received in a recess formed in the body 2 about the inlet 3, and the lower end of the nipple 5 may be connected to a supply line (not shown) in conventional fashion. The body 2 is mounted on the ledge 1 by means of a spring-type bushing 6 and a nut 7 threaded on the nipple 5. The body 2 defines a vertical generally cylindrical upwardly opening chamber 8 which communicates with the outlet 4, the lower end of the chamber 8 being defined by an annular ledge 9 which also defines the inlet 3.

The valve unit proper is basically similar to that shown in the aforesaid U.S. Patent No. 3,006,361, to which reference may be had for a detailed showing and description. It includes a tubular valve cage 10, preferably formed of brass, disposed in the chamber 8 and provided near its lower end with a plurality of radial ports 11 affording communication between the interior of the cage 10 and the chamber 8.

Within the cage 10 is a cylindrical valve plunger 12, which is freely vertically slidable but is held against rotation with respect to the cage 10 in any suitable manner. In the embodiment shown, this is accomplished by providing a pair of diametrically opposite vertical ribs (not shown) on the outer surface of the plunger 12 which are slidably received in corresponding vertical grooves 13, one of which is seen in FIG. 2, formed on the inner surface of the cage 10. A resilient washer 14, which serves as a valve lid, is mounted on the lower end of the plunger 12 by means of a machine screw 15.

An operating stem 16 is disposed above the plunger 12 and has a lower threaded portion 17 provided with left or right-hand threads as desired which is received in a threaded upwardly opening bore 18 in the plunger 12. Above the portion 17, the stem 16 has an annular enlargement 19 which is received in the recessed top inner edge of the cage 10, the stem 16 thus being oriented and held against movement into the cage 10.

A skirted cap 20 is threadedly received in the body 2 at the top of the chamber 8 and encircles the upper end of the cage 10 and the stem 16. An O-ring 21 provides a seal between the cap 20 and body 2 and a gasket 22 and a second O-ring 23 provide a seal between the cap 20 and the cage 10 and stem 17. The cap 20 orients and holds the cage 10 in place in the chamber 8, and the gasket 22 is engageable with the stem enlargement 19 to prevent the stem 16 from moving upwardly out of the cage 10.

An operating handle 24 is attached to the knurled upper end of the stem 16 by means of a screw 25, and a decorative escutcheon 26 is interposed between the handle 24 and ledge 1, all in conventional fashion.

A generally circular seat member 27, preferably formed of a relatively hard metal, is frictionally mounted in the open bottom end of the cage 10 and has a central orifice 28 extending therethrough which is in alignment with the inlet 3. The body portion of the member 27 is cylindrical and of such size as to fit tightly within the open end of the cage 10 to securely mount the member 27, and is preferably provided with a sharp undercut annular bead 29 which is engaged and deformed by the inner surface of the cage 10 to insure a secure frictional engagement. The member 27 is shaped to define an annular flange 30 which extends substantially under and bears against the bottom edge of the cage 10, and also to define a rounded upstanding seat rim 31 about the orifice 28, the rim 31 facing and being engageable with the washer 14 to serve as a seat proper. The bottom surface of the member 27 is hollowed to define a downwardly opening central cylindrical recess 32 which is larger than and surrounds the orifice 28.

A generally circular retainer 33, preferably formed of a resilient plastic material with good sealing characteristics, has a cylindrical body portion tightly received in the recess 32 of the seat member 27 to be frictionally mounted thereon. The retainer 33 is provided with an annular flange 34 which is substantially co-extensive with and extends under the seat member flange 30 and is tightly interposed between the flange 30 and body ledge 9 when the valve unit is in place to provide a watertight seal, the valve unit thus being held in place in the chamber 8 between the ledge 9 and cap 20.

The retainer 33 has a central opening 35 therethrough which is in alignment with the orifice 28 and which is of substantial axial length. Approximately midway of the opening 35, the retainer 33 is provided with an inwardly extending annular lip 36.

The reference numeral 37 designates a flow control device of a type shown in U.S. Patent No. 2,764,183, to which reference may be had for a full showing and description thereof. The device 37 comprises a resilient, generally conical body, the smaller end of which extends through the body inlet 3 and points downwardly, or upstream, and has a central, cylindrical flow passage 38 therethrough which is in alignment with the orifice 28. The outer surface of the device 37 is provided with an external annular groove 39 near the upper end which receives the retainer lip 36 to mount the device 37 on the retainer 33. When in place, the head or upper end of the flow control device 37 bears against the bottom of the recess 32 so that the device 37 is firmly supported and prevented from moving upwardly as seen in FIG. 1. Since the body of the device 37 is resilient, it is relatively easy to insert and remove it past the lip 36.

When the washer or lid 14 is against the seat 31, as seen in FIG. 1, the valve unit is closed. Rotation of the handle 24, however, will cause the plunger 12 to be moved upwardly to lift the lid 14, and water will then be allowed to flow througfih the orifice 28, out the ports 11, through the chamber 8 and out the outlet 4. Rotation of the handle 24 in the opposite direction will of course result in reclosing. The plunger 12 and washer 14 move only in a straight vertical line, minimizing wear on both the washer 14 and seat 31 during a closing operation.

The flow control device 37 functions in conventional fashion to control the rate of flow through the valve unit. At rest, or under minimum pressure, it will have the symmetrical shape shown in the drawings, and the rate of flow through the valve unit as a whole will be determined by the size of the passage 38, which is the smallest opening in the line. Upon an increase in pressure, however, water under pressure will act against the conical outer wall of the device 37, which is of greater area than the inner wall surrounding the passage 38, and constrict the passage 38 to reduce the rate of flow. The size, shape and resilience of the device 37 are selected in accordance with accepted standards to provide for control of the flow rate within given limits and given pressure variations.

The entire valve unit, including the flow control device 37, can easily be removed from the body 2 after removing the handle 24, escutcheon 26 and cap 20. It is possible, therefore, to replace any or all of the operating elements of the valve without any dismantling of the supply system, and specifically without having to reach and remove a separate flow control device. No special tools are necessary to remove the valve unit or to replace any operating element.

The retainer 33 affords a secure holder for the device 37 which still allows for easy insertion and removal. Additionally, the flange 34 of the retainer 33 serves as a watertight seal, which allows the seat member 27 to be formed of a hard metal.

Although a preferred embodiment of the invention has been shown and described herein, it will be apparent that variations might be made without departure from the invention. The invention is not, therefore, intended to be limited by the showing herein, or in any other manner, except insofar as limitations appear specifically in the following claims.

We claim:

1. In a valve unit adapted to be inserted into and removed from a valve body and including a tubular open-ended cage, a valve plunger mounting a valve lid and reciprocally movable in the cage toward and away from the open end, and actuating means for the plunger, the combination therewith of: a seat member removably mounted on the cage at the open end thereof that has an orifice adapted to be opened and closed by the lid; a retainer removably mounted on the cage beyond the seat member, said retainer having an opening therethrough that is in alignment with the seat member orifice and an inwardly extending annular lip extending around the opening; and a resilient flow control device having a passage therethrough that is in alignment with the orifice and opening, said device being provided with an external annular groove that receives the retainer lip to removably mount the flow control device on the retainer.

2. The combination of claim 1 wherein the seat member has a cylindrical body portion tightly received in the open end of the cage to mount the seat member on the cage, and is provided with an outwardly opening recess; and wherein the retainer has a cylindrical body portion tightly received in the seat member recess to be mounted thereon.

3. The combination of claim 2 wherein the retainer lip is spaced from the floor of the seat member recess and the flow control device has a head portion in said space that bears against the floor of the recess.

4. The combination of claim 3 wherein the seat member is provided with an annular flange that extends under and bears against the end of the cage; and wherein the retainer is provided with an annular flange that extends under and bears against the seat member flange.

References Cited

UNITED STATES PATENTS

| | | | |
|---|---|---|---|
| 2,764,183 | 9/1956 | Gollehon | 138—45 |
| 2,783,083 | 2/1957 | Canter | 251—120 XR |
| 3,006,361 | 10/1961 | Reinemann | 137—454.5 |
| 3,166,500 | 1/1965 | Noakes | 251—121 XR |

WILLIAM F. O'DEA, *Primary Examiner.*

H. W. WEAKLEY, *Examiner.*